United States Patent [19]

Wilczewski et al.

[11] Patent Number: 4,502,796

[45] Date of Patent: Mar. 5, 1985

[54] BEARING FOR A ROTATING SHAFT

[76] Inventors: Robert H. Wilczewski; James E. Blomquist, both of 203 E. Main, Riverton, Wyo. 82501

[21] Appl. No.: 616,587

[22] Filed: Jun. 4, 1984

Related U.S. Application Data

[62] Division of Ser. No. 498,678, May 31, 1983, , which is a division of Ser. No. 362,883, Mar. 29, 1982, abandoned, which is a division of Ser. No. 228,995, Jan. 27, 1981, abandoned, which is a division of Ser. No. 38,910, May 14, 1979, Pat. No. 4,257,282.

[51] Int. Cl.[3] .............................................. F16C 35/02

[52] U.S. Cl. .................................................... 384/439

[58] Field of Search ............... 384/129, 276, 295, 296, 384/428, 438, 439

[56] References Cited

U.S. PATENT DOCUMENTS 3,565,499 2/1971 Fisher ................................ 384/439

3,584,923 6/1971 Goossens ........................... 384/296

FOREIGN PATENT DOCUMENTS 2659562 7/1978 Fed. Rep. of Germany ...... 384/276

*Primary Examiner*—Stuart S. Levy

*Assistant Examiner*—David Werner

*Attorney, Agent, or Firm*—W. Scott Carson

[57] ABSTRACT

A bearing for a rotating shaft including a main body with three sections. The first section has a square profile whose sides are dimensioned to be received in a corresponding square slot in a support structure and held against rotation. The second section has a profile with at least five sides with four sides thereof being coplanar with the four sides of the first section. The fifth side falls within the profile of the first section and preferably is substantially the same thickness as the support structure plus a retaining clip. The third section has a profile with a portion greater than any portion of the profiles of the first and second sections wherein the bearing can be inserted into the slot in the support structure and held in place with a retaining clip positioned substantially about the second section.

3 Claims, 15 Drawing Figures

BEARING FOR A ROTATING SHAFT

This application is a division of U.S. patent application Ser. No. 498,678 filed May 31, 1983, which is a division of U.S. patent application Ser. No. 362,883 filed Mar. 29, 1982, now abandoned, which is a division of U.S. patent application Ser. No. 228, 995 filed on Jan. 27, 1981, now abandoned, which is a division of U.S. patent application Ser. No. 38,910 filed May 14, 1979, now U.S. Pat. No. 4,257,282.

FIELD OF THE INVENTION

This invention relates to the field of dot matrix printing mechanisms and more particularly to the field of transport systems for such mechanisms whereby the print head, paper, and ribbon of the printing mechanism are advanced.

BACKGROUND OF THE INVENTION

Most current dot or wire matrix printing mechanisms have complicated and cumbersome transport designs for advancing the print head, paper, and ribbon of the mechanism. Few, if any, transport systems are designed with simplicity, ease of assembly and repair, and low cost in mind. The transport system of the present invention, however, was designed to have just such qualities and to appeal particularly to the developing personal and small business computer markets.

Special attention was directed during the design of the current invention to using snap fits throughout the assembly rather than screws, to reducing the number of free parts by making as many parts integral with each other as possible and having parts perform multiple functions wherever possible, and to using the same part design wherever possible for improved dynamic balance and lower cost. Special attention was also directed to reducing the complexity of the power train by making all of the moving parts of the transport system interconnected and driven off a single motor through a common drive train, to making a ribbon cartridge assembly and support whereby the ribbon traveled on a bias to increase its life, and to reducing the overall size of the mechanism, as for example, by mounting the main body of the ribbon cartridge on the opposite side of the platen from the print head. In certain instances, new individual elements of the transport system were designed such as a new feed pawl arrangement for advancing the paper, new cam-follower arrangement for the print head, and new bearings for supporting the rotating shafts of the transport system.

With the overall design of the transport system of the present invention, only nine screws are needed for assembly and assembly time is measured in fractions of an hour (e.g., ten minutes) rather than multiples of hours as is the case with comparative systems. Further, the overall design significantly reduces the complexity and time of any repair work as the current transport system can be disassembled and reassembled in about a fifteen minute period representing a distinct advantage over existing systems.

SUMMARY OF THE INVENTION

This invention involves several novel structural features relating to the transport system of a dot matrix prining mechanism. The invention includes an improved overall design for the transport system employing easy and low cost assembly features. It also includes improved design for seveal individual elements and combinations of elements of the transport system.

The overall design of the present invention uses snap fits wherever possible instead of screws and combines previously separate parts such as strike bars and ribbon frames into integral members wherever possible. The invention mounts the ribbon cartridge assembly on an opposite side of the platen from the print head for compactness and uses an interconnected, common drive train powered by a single motor to advance the print head, paper, and ribbon. The overall design also uses common part designs wherever possible and single parts to perform multiple functions. For example, the ribbon cartridge is releasably mounted to the ribbon frame using one end of a latch member while the other end is used to bias a pressure roller against the paper advance.

Novel combinations of features in the present invention include a new ribbon cartridge assembly which automatically positions the ribbon slightly spaced from the platen to receive a paper therebetween, means in the ribbon cartridge assembly for holding the ribbon taut in front of the platen, and support means for the ribbon cartridge assembly which holds the ribbon on a bias for longer life. The ribbon cartridge assembly is also provided with improved stripping elements to decrease the tendency of the ribbon to wrap around the drive roller of the ribbon cartridge assembly.

New individual features are also disclosed in the present invention including a new pawl arrangement for advancing the paper, a new cam-follower arrangement for the print head, and a new bearing design for rotatably supporting the shafts.

DETAILED DESCRIPTION OF THE PREFERRED EMBODIMENTS

Figure 1:
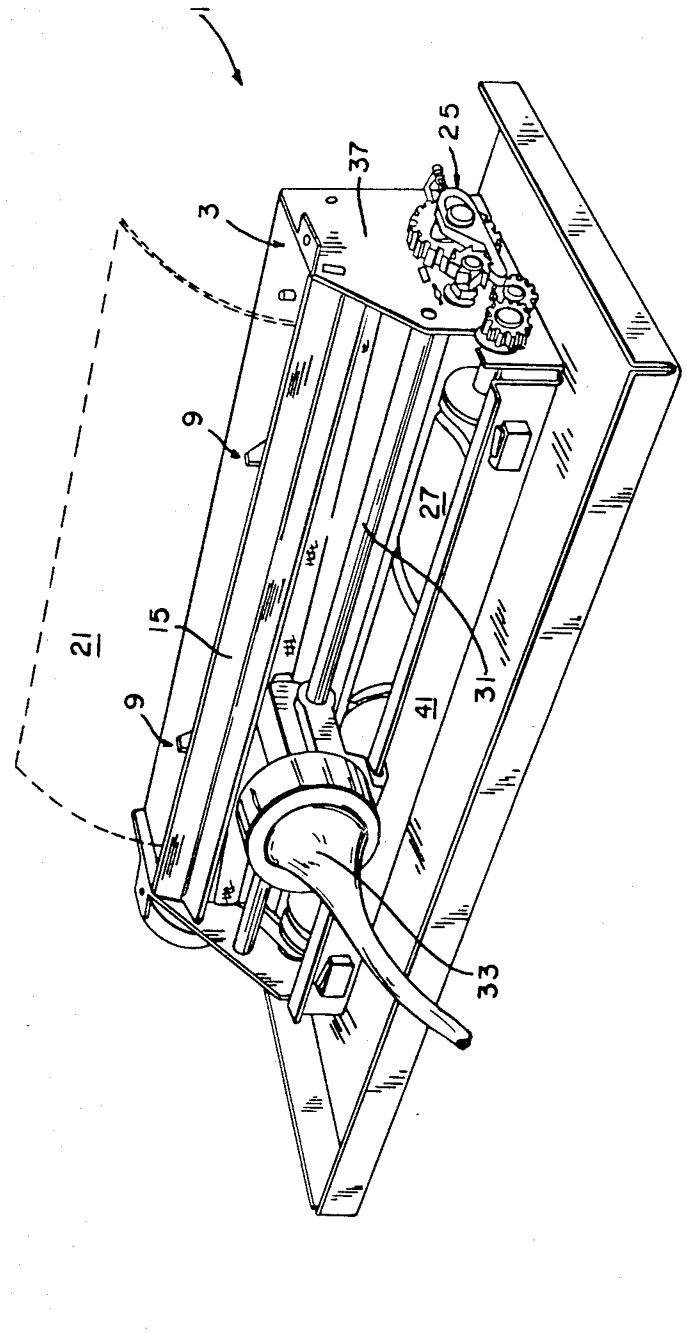
FIG. 1 is a perspective view of the dot matrix printing mechanism of the present invention.
Figure 2:
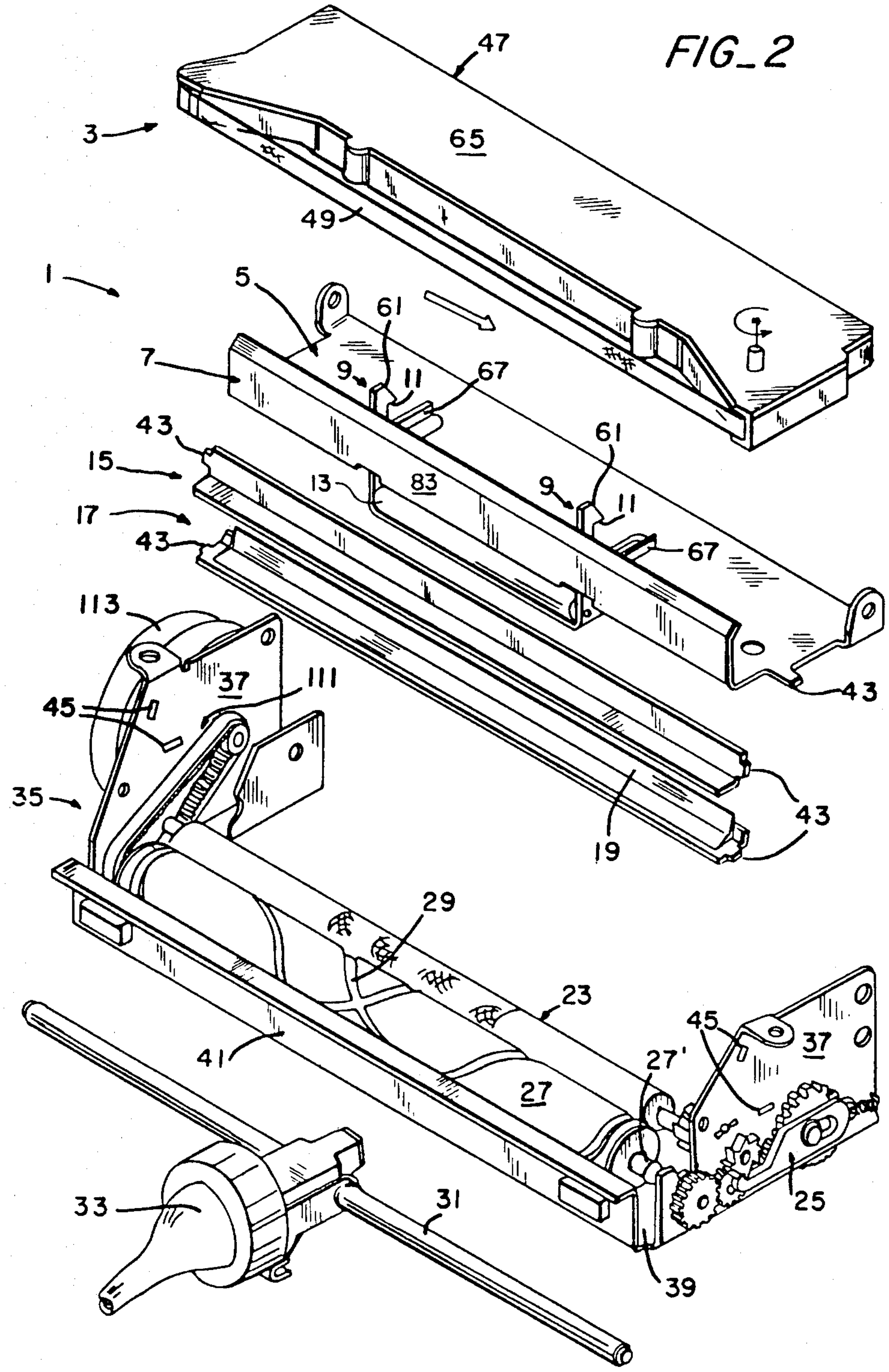
FIG. 2 is a partially exploded, perspective view of the printing mechanism of the present invention illustrating the major components of the mechanism.

The dot matrix printing mechanism 1 of the present invention is shown in FIGS. 1 and 2 in assembled and partially exploded views illustrating the relationship of the major components of the mechanism. As seen in FIGS. 1 and 2, the major components of the printing mechanism 1 are the ribbon cartridge assembly 3, ribbon frame 5 with integral strike bar 7 and pivotally mounted latch members 9, catches 11 on one end of each latch member 9 to receive the ribbon cartridge assembly 3, paper pressure roller 13 rotatably mounted between the other ends of the latch members 9, tear off blade 15, paper guide 17 with mylar strip 19 for holding the paper 21 against the strike bar 7, knurled paper advancing roller 23 with its feed pawl arrangement 25, multiple turn, main cam shaft 27 with grooves 29, and head shaft 31 for the print head 33.

Also seen in FIGS. 1 and 2 is the one-piece, main frame structure 35 of the present invention with its upstanding parallel side walls 37 resiliently and integrally attached to the floor member 39. This one-piece, main frame structure 35 is stamped from a single sheet of metal and also integrally includes the rear guide rail 41 for the print head 33. The side walls 37 are resilient and, as best illustrated in FIGS. 1 and 2, virtually all of the stationary components of the printing mechanism 1 are snapped fitted into place between the two side walls 37 by tongue-groove arrangements 43 and 45 which greatly simplifies the assembly and repair of the printing mechanism 1. In face, the transport system of the present invention requires only nine screws for assembly which significantly reduces the complexity and time of assembly from hours in existing systems to minutes (about ten minutes) in the present system. Complete disassembly and re-assembly of the present system can be accomplished in about fifteen minutes representing a significant reduction in the time needed to do any repair work.

Figure 4:
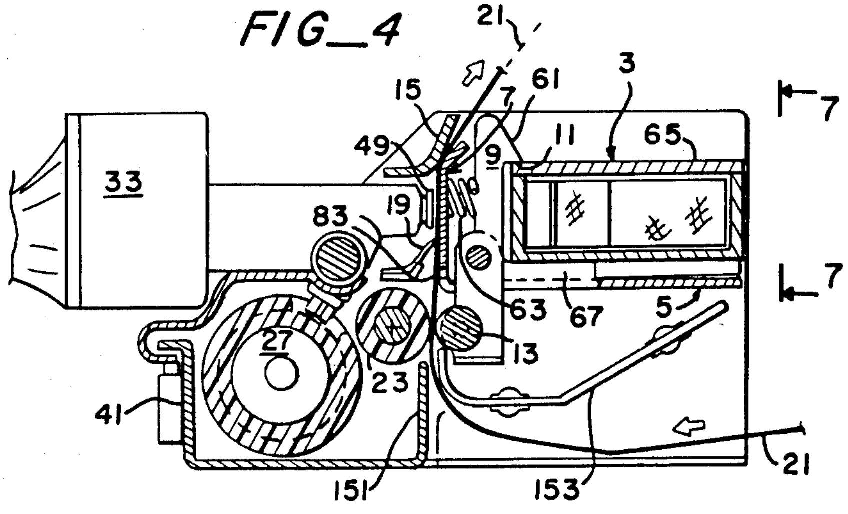
FIG. 4 is a cross-sectional view along line 4—4 of FIG. 5 illustrating the relative positioning of the major components of the printing mechanism.
Figure 5:
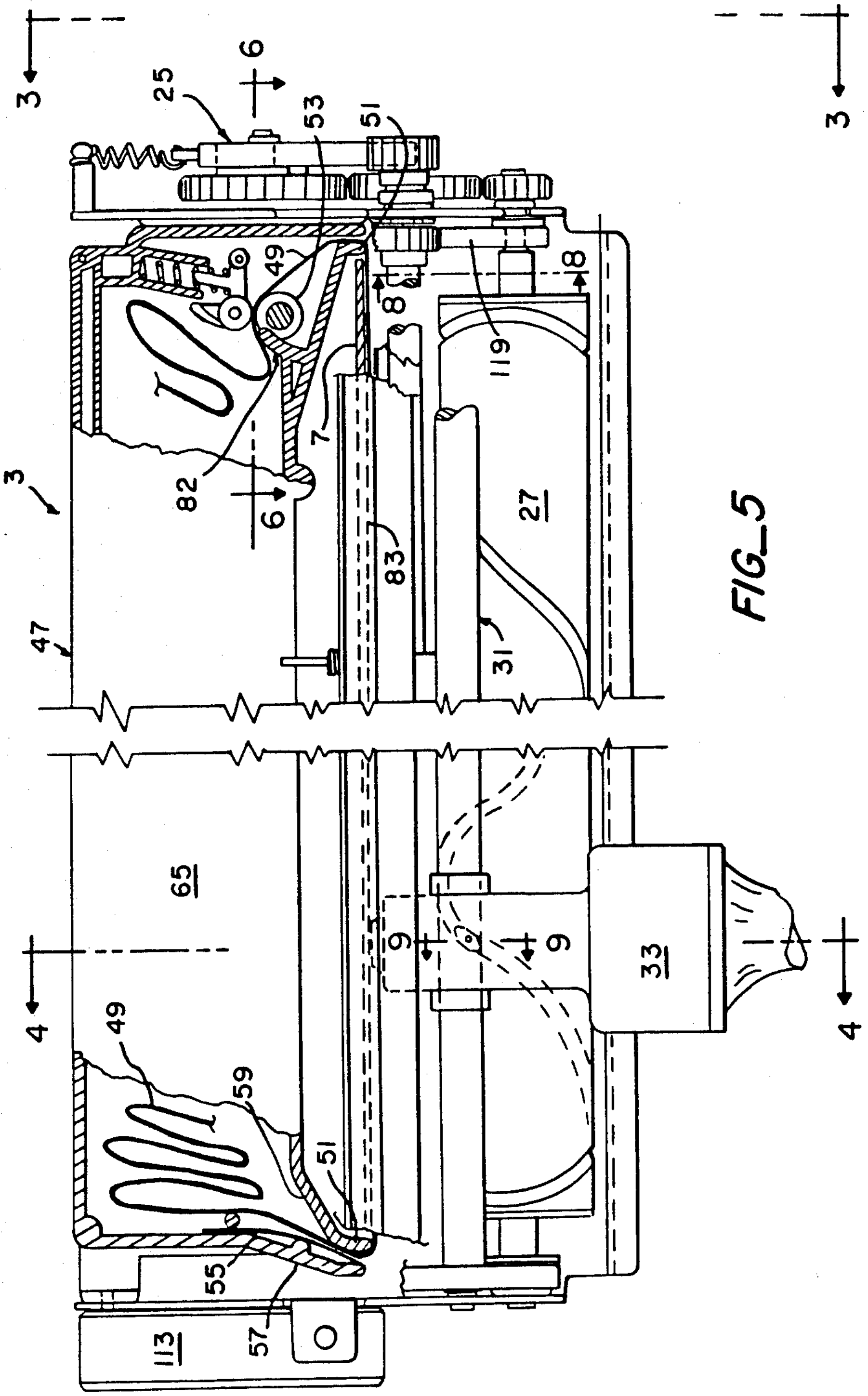
FIG. 5 is a top view of the printing mechanism of the present invention with several parts of the major components broken away for clarity.

As best seen in FIGS. 2 and 4–7, the ribbon cartridge assembly 3 of the present invention includes a main body 47, a continuous ribbon 49, and means for guiding the continuous ribbon 49 about a closed path. The closed path has a first part passing through the main body 47 as shown in FIG. 5 and a second part passing outside of the main body 47 between members 51 as best seen in FIGS. 2 and 5. Members 51 are attached to and extend outwardly of the main body 47. Driven roller 53 as seen on the right side of FIG. 5 advances the continuous ribbon 49 about the closed path and leaf spring 55 mounted between portions 57 and 59 of the main body 47 as seen on the left side of FIG. 5 serves to pinch the continuous ribbon 47 substantially between the leaf spring 55 and member 51. In this manner, the continuous ribbon 49 is maintained taut in the second part of the closed path between members 51.

Referring to FIGS. 2, 4, 6, and 7, the ribbon cartridge assembly 3 is releasably mounted to the ribbon frame 5 by pivotally mounted latch members 9 with catches 11. In operation, the ribbon frame 5 is snap fitted into a predetermined, stationary position between side walls by the tongue-groove arrangement of 43 and 45. The ribbon cartridge assembly 3 is then secured thereto by first lowering the ribbon cartridge assembly 3 in FIG. 2 until the main body 47 thereof contacts the cam surfaces 61 on the catches 11. This moves the latch members 9 away from the main body 47 against the force of the biasing spring 63 between each latch member 9 and the strike bar 7. Continued lowering of the ribbon cartridge assembly 3 will then move the upper surface 65 of the main body 47 past the catches 11 whereby they will snap over the upper surface 65 as best seen in FIG. 4. In this manner, the ribbon cartridge assembly 3 is retained against the feet 67 of the ribbon frame 5 and in a fixed position relative to the ribbon frame 5 and integral strike bar 7.

Figure 6:
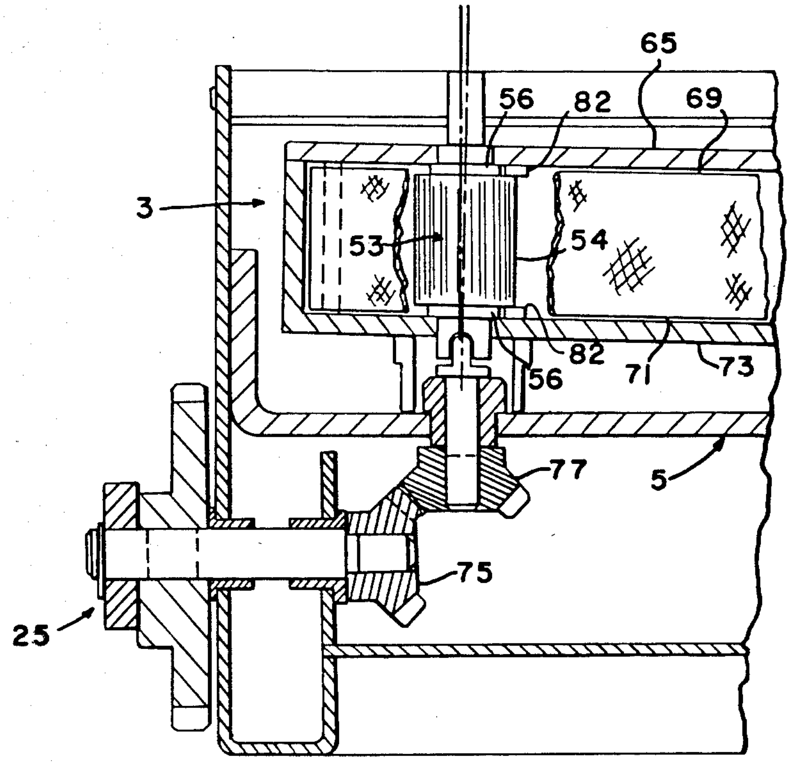
FIG. 6 is a cross-sectional view along line 6—6 of FIG. 5 illustrating the manner in which the driven roller for advancing the continuous ribbon in the ribbon cartridge assembly is powered through an interconnected, common drive arrangement with the feed pawl arrangement for advancing the paper.
Figure 7:
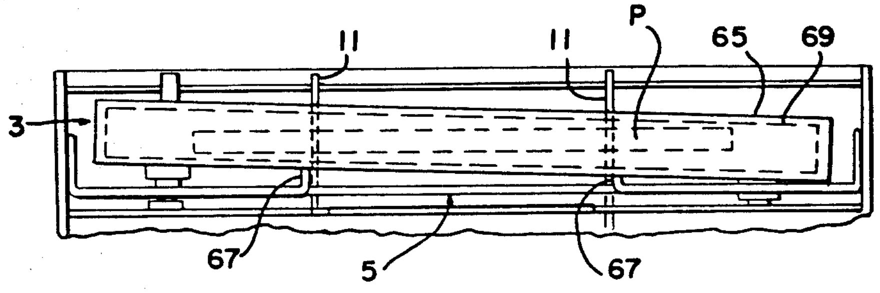
FIG. 7 is a view along line 7—7 of FIG. 4 illustrating the manner in which the ribbon cartridge assembly is mounted on a bias relative to the ribbon frame of the printing mechanism to increase the life of the ribbon.

To increase the life of the continuous ribbon 49, the ribbon cartridge assembly 3 and continuous ribbon 49 are mounted to the ribbon frame 5 on a bias with the upper and lower, parallel edges 69 and 71 in FIGS. 6 and 7 of the continuous ribbon 49 and the upper and lower surfaces 65 and 73 of the ribbon cartridge assembly 3 at an angle to the horizontal path P in FIG. 7 of the print head 33. In this manner, the print head 33 prints diagonally across the continuous ribbon 49 and uses virtually all of the entire height of the continuous ribbon 49 as the continuous ribbon 49 moves repeatedly about its closed path. To accomplish this, the feet 67 on the ribbon frame 5 and the catches 11 on the latch members 9 are of different heights as illustrated in FIG. 7. Since the driven roller 53 of the ribbon cartridge assembly 3 in FIG. 6 is rectilinear to the upper and lower surfaces 65 and 73 of the main body 47 and since the drive train for the printing mechanism 1 includes the rectilinear miter gear arrangement 75 and 77, a tongue and groove coupling 79 and 81 is provided between miter gear 77 and driven roller 53. This coupling permis a power transfer between members 77 and 53 which are mounted for rotation about intersecting axes as illustrated in FIG. 6.

FIGS. 5 and 6 also illustrate an improved means for stripping the continuous ribbon 49 from the driven roller 53. The stripping means includes a free standing finger member 82 integrally mounted respectively to the members forming upper and lower surfaces 65 and 73. The driven roller 53 has a middle portion 54 for contacting the continuous ribbon 49 (see FIG. 6) and end portions each of which has a part 56 of lesser diameter than middle portion 54. In assembly, the end portions of the driven roller 53 are rotatably received respectively in the upper and lower half members forming the upper and lower surfaces 65 and 73 with the finger members 82 respectively positioned in a substantially abutting relationship to parts 56 whereby the continuous ribbon 49 is stripped from the driven roller 53 as it passes thereabout. Integrally mounting the finger members 82 to the upper and lower surface members reduces the number of free parts and further reduces cost and assembly time.

Referring back to FIGS. 2, 4, and 5, the continuous ribbon 49 is maintained taut along its second part part between the members 51 of the ribbon cartridge assembly 3 as explained above. Further, the two members 51 extend outwardly of the main body 47 of the ribbon cartridge assembly 3 for a distance not only greater than the thickness of the striking bar 7 but also greater than the distance between the platen surface 83 of the striking bar 7 and the main body 47 when the ribbon cartridge assembly 3 is mounted in its fixed position against the ribbon frame 5. Members 51 are also spaced apart a greater distance than the length of the strike bar 7. In this manner, the strike bar 7 is received in the gap between the second path part of the continuous ribbon 49 and the main body 47 with the second path part slightly spaced from the platen surface 83 to receive the paper 21 therebetween as best seen perhaps in FIGS. 4 and 5. With this arrangement, the paper 21 can be easily and quickly fed between the second path part of the continuous ribbon 49 and the platen surface 83 of the strike bar 7. The mylar strip 19 on paper guide 17 also serves to assist the feeding of the paper 21 between the continuous ribbon 49 and platen surface 83 as shown in FIG. 4.

Figure 3:
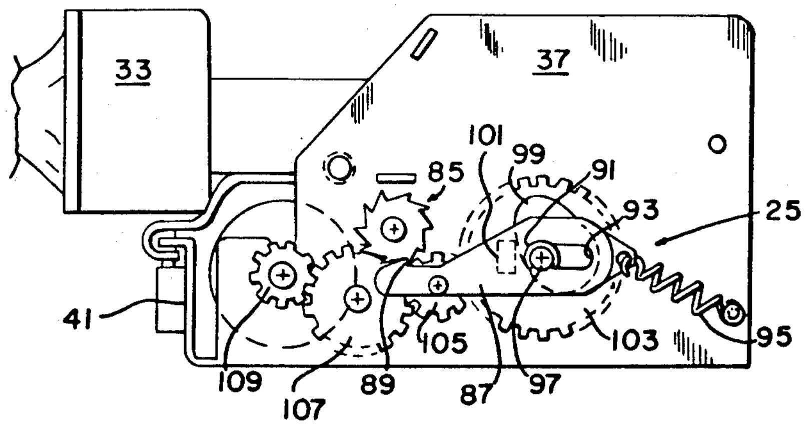
FIG. 3 is a view taken from the right to FIG. 1 and along line 3—3 of FIG. 5 illustrating the feed pawl arrangement for advancing the paper roller of the printing mechanism.

The feed pawl arrangement 25 for advancing the ratchet 85 and knurled paper roller 23 is best seen in FIGS. 1-3. The feed pawl member 87 is of one-piece construction and includes a catch member 89 on one end which is engageable with the teeth of the ratchet 85. The feed pawl 87 also includes an elongated slot with first and second ends 91 and 93 through its middle portion. A spring 95 biases the feed pawl 87 away from the fixed, rotational axis of the ratchet 85 and paper roller 23 with a shaft 97 abutting the first end 91 of the elongated slot. A cam member 99 is symmetrically mounted on the shaft 97 and a follower 101 is mounted on the inner, planar side of the feed pawl 87. The follower 101 abuts the cam member 99 under the influence of biasing spring 95. In operation, shaft 97 with cam member 99 is rotated by the gear arrangement of gears 103, 105, 107, and 109 which is driven by the rotating cam shaft 27 from the belt drive arrangement 111 powered by the single motor 113 as best seen in FIG. 2. As the cam member 99 in FIG. 3 rotates, it advances the feed pawl 87 against the force of the spring 95 whereby the catch member 89 engages a tooth of the ratchet 85. Because of the asymmetrical mounting of the cam member 99 on the shaft 97, continued rotation of the cam member 99 allows the spring 95 to draw the feed pawl 87 away from the fixed axis of the ratchet 85 bringing the engaged tooth with it and rotating the ratchet 85 about its fixed axis. In this manner, the paper roller 23 is also rotated and the paper 21 advanced in steps.

Figure 8:
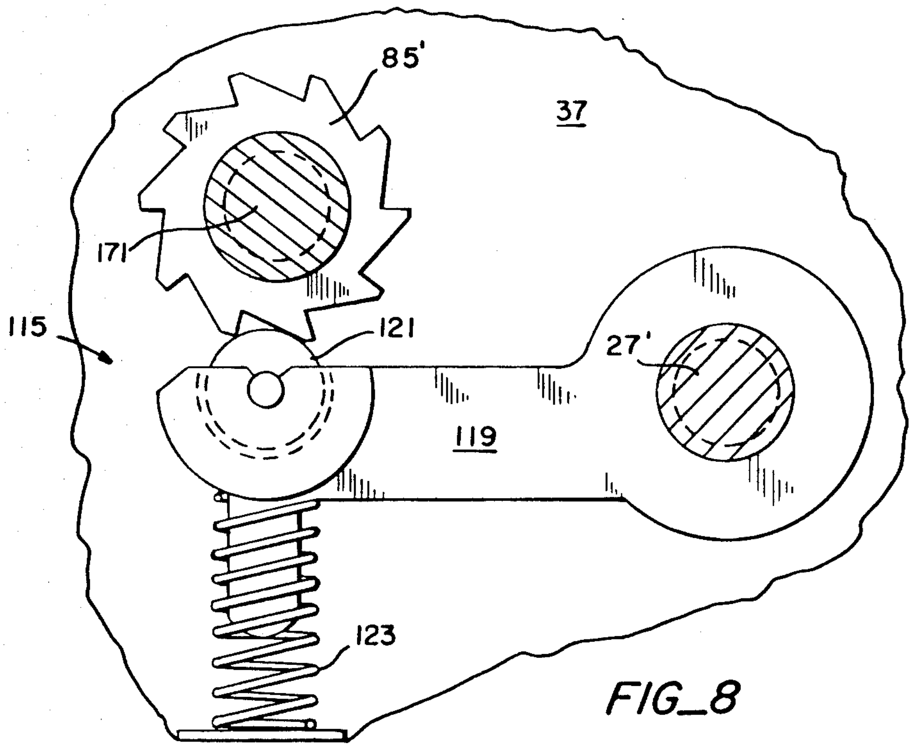
FIG. 8 is a view along line 8—of FIG. 5 illustrating the detent means for inhibiting the movement of the ratchet of the feed pawl arrangement of FIG. 3 between strokes of the feed pawl.

A means 115 in FIG. 8 is also provided in inhibit movement of the ratchet 85 until the cam member 99 is rotated to the position where it allows the spring 95 to withdraw the feed pawl 87 and advance the ratchet 85. This inhibiting means 115 includes a ratchet 85' mounted to the same shaft 117 as ratchet 85 but on the opposite side of side wall 37. Ratchet 85' is made from the same mold as ratchet 85 for improved dynamic balance and lower manufacturing costs. Arm 119 is pivotally mounted at one end to the end shaft 27' of cam shaft 27 and rotatably carries the cylindrical detent 121 in a recess in its other end. Spring 123 biases the detent 121 against the ratchet 85'; however, the inhibiting force of spring 123 is less than the withdrawing of spring 93 so that the ratchets 85 and 85' can be advanced under the force of spring 93 and against the force of spring 123.

Figure 9:
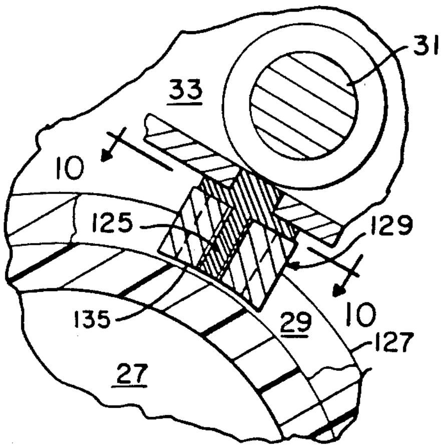
FIG. 9 is a view along line 9—9 of FIG. 5 illustrating the cam-follower arrangement by which the print head is advanced.
Figure 10:
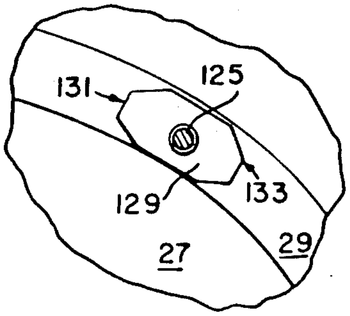
FIG. 10 is a view along line 10—10 of FIG. 9 illustrating the bevelled, cross-sectional shape of the shoe member of the cam-follower arrangement.

The cam-follower arrangement between the print head 33 and the grooved, cam shaft 27 is illustrated in FIGS, 4, 9, and 10. In this arrangement, the print head 33 is mounted on the head shaft 31 for movement there along and is the follower. The print head 33 has a pin member 125 in FIG. 9 rigidly mounted to it and extending outwardly for a distance greater than the fixed distance between the print head at line 10—10 and the outer surface 127 of the cam shaft 27. The free end of the pin member 125 extends well into the groove 29 of the cam shaft 27 and away from the print head 33 at least about twice the fixed distance mentioned above. Rotatably mounted about the pin member 125 is the shoe member 129. The pin member 125 has a diameter less than the width of the groove 29 as illustrated in FIG. 10 and the shoe member 129 has a width slightly less than the width of the groove 29 and a length greater than the groove width. The ends 131 and 133 of the shoe member are bevelled to facilitate travel in the multiple turn cam shaft 27. As best seen in FIG. 9, the shoe member 129 has a curved portion 135 corresponding to the curve of the groove 29 and extending outwardly of the free end of the pin member 125. In operation, the shoe member 129 rides in the groove 29 moving the pin member 125 and follower member (print head 33) with its relative to the cam shaft 27. As best seen in FIG. 9, because the shoe member 129 and pin member 125 ride deeply into the groove 129, the bearing load is applied substantially perpendicular to the axis of the pin member 125 along its length in the manner of a supported beam rather than a cantilevered beam as is more typical in the cam-follower arrangements of prior mechanisms. With the cam-follower arrangement of the present invention, there is an improved bearing condition with signficantly less cocking problems and less likelihood of the bearing self-locking. Further, there is improved life and reduced load resistance as the cam-follower arrangement turns at the ends of the printing mechanism for its return travel.

Figures 11, 12:
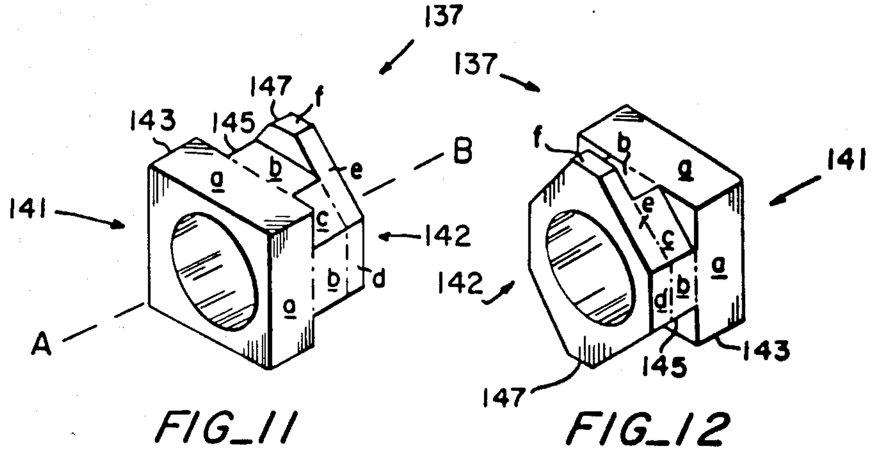
FIG. 11 is a front perspective view of the square bearings used throughout the printing mechanism of the present invention to rotatably mount the shafts of the transport system between the side walls of the main frame structure.
FIG. 12 is a back perspective view of the bearing of FIG. 11.
Figure 14:
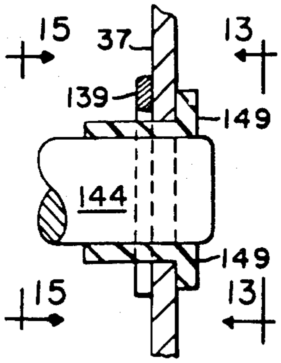
FIG. 14 is a cross-sectional view along line 14—14 of FIG. 13 further illustrating the manner in which the bearing of the present invention is positioned in the side wall of the main frame structure.
Figure 13:
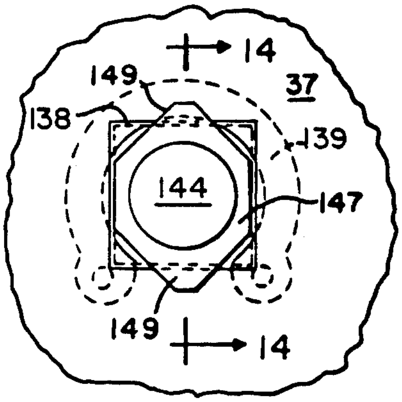
FIG. 13 is a back view along line 13—13 of FIG. 14 illustrating the manner in which the bearing of FIG. 11 and 12 is mounted and retained in a square slot cut through the side wall of the main frame structure.
Figure 15:
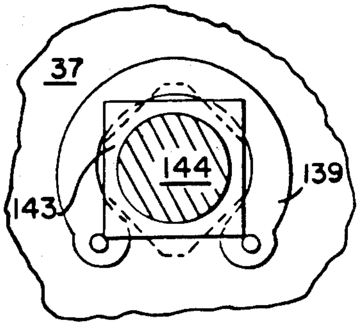
FIG. 15 is a front view along line 15—15 of FIG. 14 also illustrating the bearing of the present invention in place in the side wall of the main frame structure.

FIGS. 11-15 illustrate the bearing 137 used in the present invention to support all of the rotating shafts of the transport system. The bearing 137 is designed to be slideably received in a square slot 138 (see FIG. 13) in the side walls 37 and held in place by a press fit, the load of the shaft, or positively by a retaining clip 139. The bearing 137 has a front 141 and back 142 but can be mounted in either direction through the square slot 138 depending upon the available clearance near the square slot. The bearing 137 has a main body extending along a first axis A-B of symmetry and a hole through it for rotatably receiving the shaft 144. The main body is composed of first, second, and third sections 143, 145, and 147. The first section 143 extends in the direction of the first axis and has a square profile when viewed along the first axis. This square profile is dimensioned slightly less than the square slot 138 and will slideably fit therethrough with the sides a of the square profile and the square slot 138 parallel. The second section 145 abuts the first section 143 and extends therefrom in the direction of the first axis. The second section 145 has an octagonal profile when viewed along the first axis. Four sides b of the hexagonal profile are substantially coplanar with the sides a of the square profile of the first section 143 as illustrated in FIGS. 11 and 12 and the remaining four sides c of the octagonal profile extend outwardly of the first axis for a distance less than the corresponding portions of the square profile of the first section 143 extend outwardly of the first axis. The depth of the octagonal profile of the second section 143 along the first axis is approximately equal to the thickness of the side wall 37 plus the thickness of the retaining clip 139. The third section 147 of the bearing 137 abuts the second section 145 and extends therefrom in the direction of the first axis. The third section 147 also has an octagonal profile when viewed along the first axis. Unlike the profiles of the first and second sections 143 and 145, however, the profile of the third section 147 has two portions 149 (see FIG. 13) extending outwardly of the first axis for a distance greater than any portions of the other two profiles and is dimensioned to prevent passage of the third section 147 through the square slot 138. The octagonal profile of the third section 147 has two sides d coplanar with sides b of the second section 145, four sides c coplanar with sides c of the second section 145, and two sides f on the protruding portions 149. In operation, the first section 143 of the bearing 137 is passed through the square slot 138 until the protruding portions 149 of the third section 147 abut one side of the side wall 37 defining the square slot 138 with the second section received along the first axis in part within and in part beyond the square slot 138. The shaft 144 can then be rotatably received within the hole of the main body of the bearing 137 with the bearing 137 remaining in place either due to a press fit or the load of the shaft 144. If desired, the bearing 137 can be positively retained in the square slot 138 by mounting the retaining clip 139 about the part of the second section 145 which extends beyond the square slot 138. In this position, the retaining clip 139 extends outwardly of the first axis for a distance greater than the profile of the first and second sections 143 and 145. With the retaining clip 139 in place as illustrated in FIGS. 14–15, the bearing 137 is positively retained in the square slot 138 of the side wall 37.

In operation as best seen in FIG. 4, the ribbon cartridge assembly 3 is mounted to the ribbon frame 5 with springs 63 biasing the catches 11 of latch members 9 against the upper surface 65 of the ribbon cartridge assembly 3 and the pressure roller 13 mounted between the latch members 9 against the knurled paper advancing roller 23. Paper 21 is then fed from behind (or below) between the front and back paper guides 151 and 153 to the nip between rollers 13 and 23 from which it is advanced between the mylar strip 19 and platen surface 83 upwardly between the continuous ribbon 49 and the platen surface 83 and past the tear off blade 15. Once the paper 21 is in position for printing, the transport system of the present invention will automatically coordinate the advancing of the print head, paper, and ribbon through the common drive train arrangement from the single drive motor 113 as described above.

While several embodiments of the present invention have been described in detail herein, various changes and modifications can be made without departing from the scope of the invention.

We claim:

1. A bearing for use in combination with a square slot in a support structure to rotatably mount a shaft for movement relative to said bearing and said support structure, said bearing comprising:

a main body extending along a first axis and having a hole therethrough for rotatably receiving said shaft, said hole extending in a direction substantially parallel to said first axis, said main body further including:

(i) a first section extending in the direction of said first axis and having a square profile when viewed along said first axis, said square profile being dimensioned slightly less than said square slot to slideably fit therethrough with the sides of said square profile and said square slot parallel, (ii) a second section abutting said first section and extending in the direction of said first axis, said second section having a profile when viewed along said first axis, said profile having at least five sides spaced from each about said first axis with four of said sides being coplanar with the sides of said square profile of said first section, said at least one remaining side of said second section profile extending outwardly of said first axis for a distance less than the corresponding portion of said square profile of said first section extends outwardly of said first axis, said profile of said second section having a first part extending along said first axis from said first section for a first distance and a second part extending therefrom along said first axis for a distance substantially equal to the thickness of said support structure defining said square slots, and, (iii) a third section abutting said second section and extending in the direction of said first axis, said third section having a profile when viewed along said first axis, said profile having a least one portion thereof extending outwardly of said first axis for a distance greater than any portions of said profiles of the first and second sections and being dimensioned to prevent passage of said third section through said square slot, and, a retaining member positionable substantially about said first part of said second section and between said first and third sections, said retaining member having at least a position thereof extending outwardly of said first axis when positioned about said second section for a distance greater than said profiles of said first and second sections whereby said first section of said bearing can be passed through said square slot until said end portion of said third section abuts the support structure defining the square slot and said second part of said second section is received in said square slot, said retaining member positioned about said first part of said second section, and said shaft rotatably mounted within the hole of the main body of said bearing for movement relative to said bearing and said support structure.

2. The bearing of claim 1 wherein the profiles of said second and third sections are octagonal.

3. A bearing for use in combination with a square slot in a support structure to rotatably mount a shaft for movement relative to said bearing and said support structure, said bearing comprising:

a main body extending along a first axis and having a hole therethrough for rotatably receiving said shaft, said hole extending in a direction substantially parallel to said first axis, said main body further including:

(i) a first section extending in the direction of said first axis and having a sqaure profile when viewd along said first axis, said square profile being dimensioned slightly less than said square slot to slideably fit therethrough with the sides of said square profile and said square slot parallel, (ii) a second section abutting said first section and extending in the direction of said first axis, said second section having a profile when viewed along said first axis, said profile having at least five sides spaced from each about said first axis with four of said sides being coplanar with the sides of said square profile of said first section, said at least one remaining side of said second section profile extending outwardly of said first axis for a distance less than the corresponding portion of said square profile of said first section extends outwardly of said first axis, and (iii) a third section abutting said second section and extending in the direction of said first axis, said third section having a profile when viewed along said first axis, said profile having at least one portion thereof extending outwardly of said first axis for a distance greater than any portions of said profiles of the first and second sections and being dimensioned to prevent passage of said third section through said square slot whereby said first section of said bearing can be passed through said square slot until said one portion of said third section abuts the support structure defining the square slot and said second section is received in said square slot and said shaft rotatably mounted within the hole of the main body of said bearing for movement relative to said bearing and said support structure.

* * * * *